(12) United States Patent
Kim

(10) Patent No.: US 6,680,953 B1
(45) Date of Patent: Jan. 20, 2004

(54) SIGNALING NETWORK LAYER PROTOCOL OF ATM-BASED MOBILE COMMUNICATION NETWORK

(75) Inventor: Hyoung-Taek Kim, Koonpo (KR)

(73) Assignee: LG Information & Communication, Ltd., Seoul (KR)

( * ) Notice: Subject to any disclaimer, the term of this patent is extended or adjusted under 35 U.S.C. 154(b) by 0 days.

(21) Appl. No.: 09/472,845

(22) Filed: Dec. 28, 1999

(30) Foreign Application Priority Data

Dec. 30, 1998 (KR) .............................. 98-62366

(51) Int. Cl.[7] .................................................. H04J 3/16
(52) U.S. Cl. ........................ 370/467; 370/328; 370/469
(58) Field of Search .............................. 370/310.1, 338, 370/395.6, 349, 410, 469, 524, 466, 467, 397

(56) References Cited

U.S. PATENT DOCUMENTS 5,748,636 A * 5/1998 Gradischnig ............. 370/395.2
6,154,467 A * 11/2000 Hager et al. ................. 370/467
6,222,843 B1 * 4/2001 Mauger ....................... 370/397
6,282,191 B1 * 8/2001 Cumberton et al. ........ 370/352
6,490,284 B1 * 12/2002 Graf ......................... 370/395.2

FOREIGN PATENT DOCUMENTS

FI   WO 98/57519   * 12/1998   .......... H04Q/11/04

OTHER PUBLICATIONS

Wireless Intelligent ATM Network and Protocol Design for Future Personal Communication Systems, Cheng, Fang–Chen and Holtzman, Jack M., IEEE, 1997.*

* cited by examiner

Primary Examiner—Dang Ton
Assistant Examiner—Melanie Jagannathan
(74) Attorney, Agent, or Firm—Fleshner & Kim, LLP

(57) ABSTRACT

A signaling network layer protocol of an ATM-based mobile communication network including an MSC and an RNC connected by point-to-point in which a predetermined message form, a primitive between an upper and a lower layers, a state of a protocol individual and an operational procedure are defined so that a signal message between the MSC and the RNC is processed through a single signaling network layer (SNL).

26 Claims, 5 Drawing Sheets

| F | C15 | C14 | C13 | C12 | C11 | C10 | C9 |
|---|-----|-----|-----|-----|-----|-----|----|
| C8 | C7 | C6 | C5 | C4 | C3 | C2 | C1 |

SIGNALING NETWORK LAYER PROTOCOL OF ATM-BASED MOBILE COMMUNICATION NETWORK

BACKGROUND OF THE INVENTION

1. Field of the Invention

The present invention relates to a protocol of a mobile communication network, and more particularly, to a signaling network layer protocol between an RNC and an MSC having a point-to-point structure in an ATM (asynchronous transfer mode)-based mobile communication network.

2. Description of the Background Art

Physical matching in a conventional mobile communication network is a connection in a low-speed time division switching method on the basis of 64 Kbps. Signaling network layers provided for transporting a signal message between a radio network controller (termed as 'RNC', hereinafter) and a mobile switching center (termed as 'MSC', hereinafter) includes two layers of an MTP (message transfer part) and an SCCP (signaling connection control part) on the basis of No. 7 signaling network. Functions of each layer are as follows.

First, the MTP function includes a signal message processing function and a signaling network managing function. The signal message processing function performs various functions for reliably transporting signal messages requested by a user at a signal transmission point to a user part of signal receiving point. The signal message processing function includes a message discrimination function for discriminating a signal message, a message distribution function for distributing the discriminated signal message to a proper function individual; and a message routing function for routing the signal message by a signal receiving point on the basis of signal points forming a signaling network.

The signaling network management function performs various functions by re-constructing a signaling network so as to guarantee a reliability of a signaling network in case that a signaling link is broken down or a signal transmission point is broken down, which includes a signaling link managing function of allocating a signal terminal and a signaling link between signal points forming the signaling network and performing activation and deactivation function; a signal route managing function for managing the signaling link established between signal points by grouping them; and a signal traffic managing function for monitoring a traffic of the signal message and sensing occurrence of a malfunction to thereby smoothly manage a signal flow.

The SCCP transmits a signal of an upper layer or a general-use data information, and extends a limited address interpretation capacity of the message transfer unit (MTP) of the lower layer, thereby enabling various signaling link connection management, and thanks to the connection linking, the signal message is reliably transmitted.

Services provided by the SCCP includes a 'CLASS 0', a basic connectionless-mode service, a 'CLASS 1', a connectionless-mode service using a MTP-based sequential alignment function, and a 'CLASS 3', a connection-mode service having a flow control function.

As related functions, there are a signal connection establishing and releasing function using a lower logical linking, a function of mapping a network address to a signal related identifier, an upper message dividing and re-assembling function, a signal connection discriminating function, a message sequence error detection function and a recovery function.

The signaling network layer protocol (MTP and SCCP) on the basis of the No. 7 signaling network of the conventional mobile communication network is a signaling protocol that is capable of managing the network effectively in the complicated network structure of a point-to-multipoint between a plurality of physical individuals. Thus, it is very complicate to set various parameters required for managing the signaling network and its maintenance in the aspect of operation is also complicated, and accordingly, it is a protocol having comparatively great load in for processing signals.

Therefore, in such a network structure mostly formed by point-to-point connections as applied between the RNC and the MSC in the mobile communication network, the No 7-based signaling protocol has a relatively heavy load for processing the signal message, and thus, it is considered much ineffective signaling protocol.

Moreover, the ATM (asynchronous transfer mode)-based signaling network needs to transfer a great amount of signal message through a single physical connection line at a high speed, it should be constructed in a manner that the load for the signal processing is minimized.

Resultantly, the signaling network layer protocol (MTP and SCCP) on the basis of the No. 7 signaling network in the conventional mobile communication network is disadvantageous in that it is complicate to set various parameters required for managing the signaling network and its maintenance in view of operation is also complicated. Especially, the load for processing signals in the network structure mostly formed by point-to-point connections, is relatively heavy.

SUMMARY OF THE INVENTION

Therefore, an object of the present invention is to provide a signaling network layer protocol of an ATM-based mobile communication network which is capable of providing a proper signaling network layer protocol in case that a signal message is processed on the basis of an ATM between an RNC and an MSC, so as to process the signal message by means of a primitive corresponding to an upper user part or a lower signaling link part internally, thereby simplifying maintenance in the aspect of operation for processing the signal message as well as minimizing its load.

To achieve these and other advantages and in accordance with the purposed of the present invention, as embodied and broadly described herein, there is provided a signaling network layer protocol of an ATM-based mobile communication network including an MSC and an RNC connected by point-to-point in which a predetermined message form, a primitive between an upper and a lower layers, a state of a protocol individual and an operational procedure are defined so that a signal message between the MSC and the RNC is processed through a single signaling network layer (SNL).

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A third-generation mobile communication forming an IMT-2000 network is a high speed message switching (ATM) connection of 45 Mbps.

Figure 1:
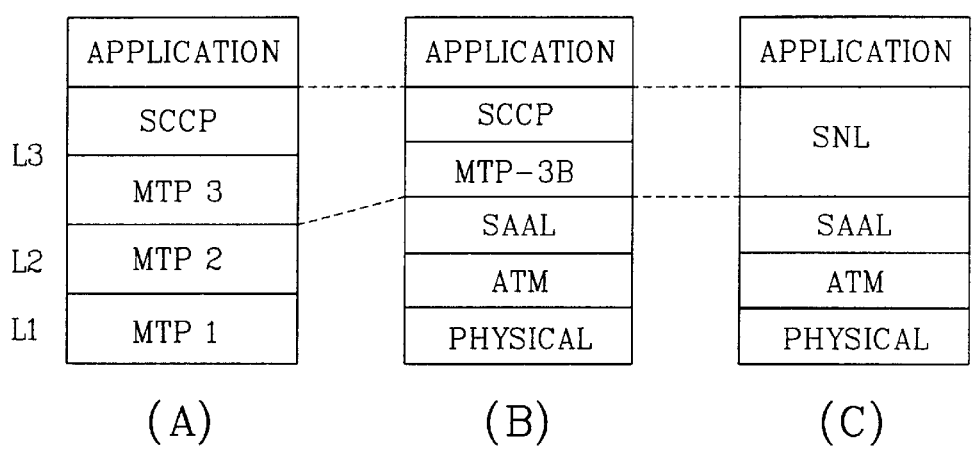
FIGS. 1A, 1B and 1C comparatively show a No.7-based protocol in accordance with a conventional art and No.7-based protocol stack in an ATM network in accordance with the present invention.

FIG. 1A shows a No.7-based protocol stack in an existing network, FIG. 1B shows a No.7-based protocol stack in an ATM network, and FIG. 1C shows a protocol stack proposed in the present invention.

As shown in the drawings, the two signaling network layers MTP and SCCP of the existing No.7-based protocol stack is constructed to be one signaling network layer SNL in the present invention, thereby performing a signal connection managing function and a signal message transmission function through a point-to-point connection, which simplifies various parameters required for processing signals or its processing method.

Figure 2:
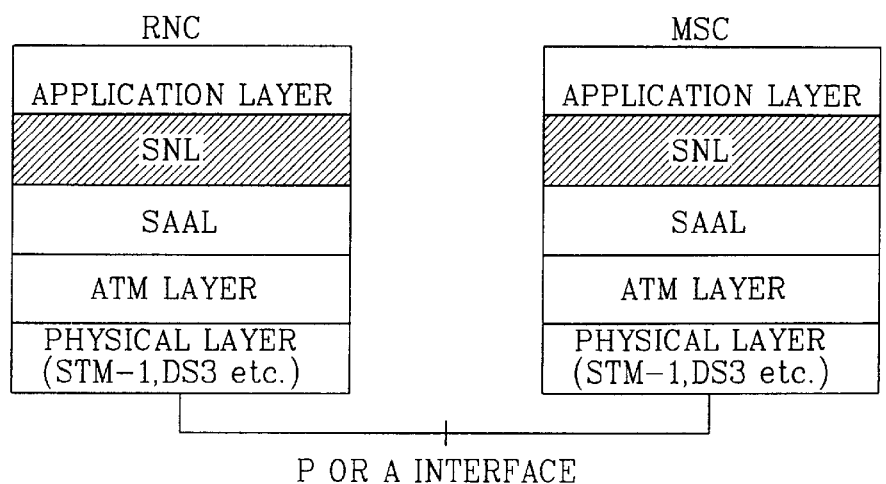
FIG. 2 shows a protocol stack between an RNC and an MSC in a mobile communication in accordance with the present invention.

FIG. 2 shows a protocol stack between an RNC and an MSC in a mobile communication in accordance with the present invention.

As shown in FIG. 2, the protocol stack structures of the RNC and the MSC in the mobile communication network of the present invention includes an application layer, a signaling network layer (termed as 'SNL', hereinafter), a signaling ATM adaptation layer (termed as 'SAAL', hereinafter), an ATM layer and a physical layer, respectively, that are connected by P or A interface.

Such constructed protocol of the present invention only provides a connectionless-mode signal connection service, while performing a simple signaling link connection management in the signaling network layer SNL on the basis of the ATM-based connection-mode signaling link.

When the upper application layer transmits a signal message through the SNL or receives a signal from the other party, the SNL transmits a signaling layer establishment request and establishment indicate primitive to the upper layer for each, and performs an operation of transferring an upper layer message and a signal message of the other party by means of a signal data transmission request and transmission display primitive when it transfers a required message.

The application layer, the SAAL, the ATM layer and the physical layer performs the same service as the corresponding layers of the existing No.7-based protocol.

Figures 3, 4:
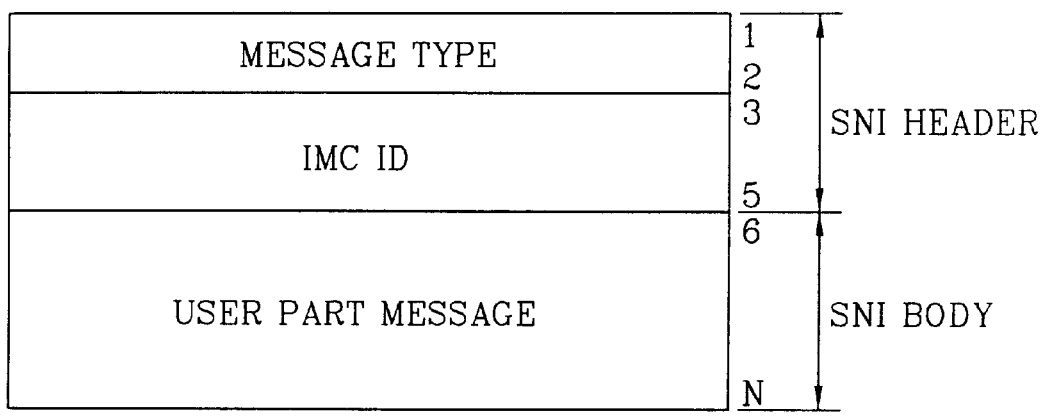
FIG. 3 shows a message structure according to a signaling network layer protocol in accordance with the present invention.
FIG. 4 shows an ImC-ID structure of FIG. 3 in accordance with the present invention.

FIG. 3 shows a message structure according to a signaling network layer protocol in accordance with the present invention.

The message structure according to the SNL protocol is as shown in FIG. 3, which consists of a signaling network interface (termed as 'SNI', hereinafter) carrying information on a message type, an imaginary connection identifier (termed as 'ImC-ID', hereinafter), and an SNI body including an upper user part signal message for use in a data frame and a unit-data frame.

The signaling network message types are shown in the below Table 1.

As shown in FIG. 4, the ImC-ID includes 'F' bit indicating a direction of the SNL message (in case of '0', it signifies a message received from the party that generated the identifier, while in case of '1', it signifies a message transferred from the party generating the identifier) and 'C15~C1' (for example, in case of '0', it signifies all the logical link connection by means of a global connection ID, while in case of '1~32766', it signifies a specific logical link connection by means of an imaginary link ID, and in case of '32767', it indicates that it is going to be used for other use later by means of a dummy connection ID) indicating an ImC-ID value.

TABLE 1

| Message type | Code | Explanation |
| --- | --- | --- |
| Establish | 00000001 | Connection establishment request frame |
| Establish Ack. | 00000010 | Connection establishment response frame |
| Release | 00000011 | Connection release request frame |
| Release Ack. | 00000100 | Connection release completion frame |
| Data | 00000101 | Connection-mode data frame |
| Udata | 00000110 | Connectionless-mode data frame |
| Data Ack. | 00000111 | Response frame of connection-mode data frame |

The service primitive used between the user part of upper layer in the SNL protocol and the SNL protocol individual are defined as shown in the below Table 2, of which 'X' indicates 'application to protocol operation' and '-' indicates 'not application to the protocol operation'.

Figure 5:
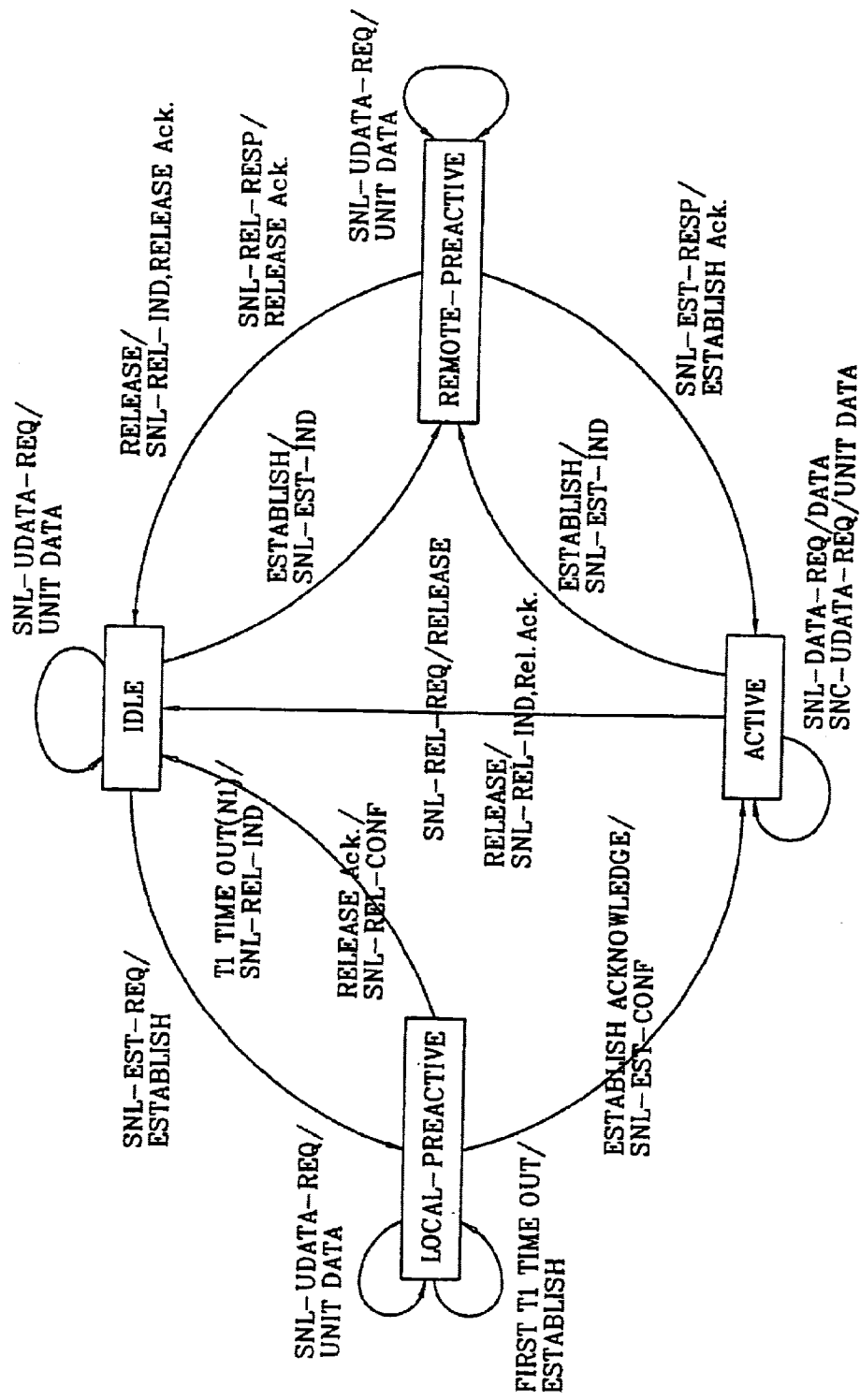
FIG. 5 is a view of SNL state transition model in accordance with the present invention.

A state of the protocol individual operated in the SNL is defined as follows. 'Idle state' signifies a state that a logical virtual linking has not been established and linking between peers has not been established, 'Lacal-PreActive state' signifies a state that a local first transfers the linking establishment request and is waiting for a response, 'Remote-PreActive state' signifies a state that 'Remote' is going to send a response as it received the linking establishment request, and 'Active state' signifies a state that peer-to-peer connection has been established through the logical virtual link. In this respect, state transition model of each state is as shown in FIG. 5.

TABLE 2

| Generic Name | Type | | | |
| --- | --- | --- | --- | --- |
|  | Request | Indicate | Response | Confirm |
| SNL-ESTABLISH | X | X | X | X |
| SNL-RELEASE | X | X | X | X |
| SNL-DATA | X | X | — | — |
| SNL-UDATA | X | X | — | — |

The procedures of the logical link connection for processing a signal message between the RNC and the MSC according to the SNL protocol, its releasing and the message transferring procedure will now be described with reference to FIGS. 6 through 10.

Figure 6:
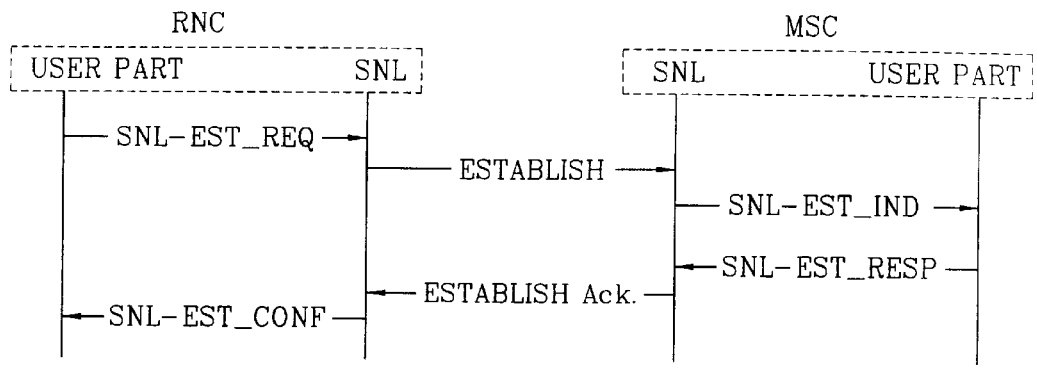
FIG. 6 shows a logical link connection establishment procedure in the mobile communication network in accordance with the present invention.

First, referring to the logical link connection establishment, when a link establishment request primitive is received by the upper block, the local discloses it. The normal operation of the logical link connection establishment process is as shown in FIG. 6.

To begin with, in case that the primitive SNL-EST_REQ requesting the logical link connection establishment is transferred from the upper user part of the RNC, the SNL transfers a connection request message (Establish) to the MSC by taking the ImC-ID as a parameter, upon receipt of it.

Upon receipt of the connection request message (Establish), the SNL of the corresponding MSC transfers a primitive SNL-EST_IND ordering a logical link connection establishment to the upper user part, and then, when it receives a establishment response primitive SNL-EST_RESP from the corresponding upper user part, it transfers a connection establishment response message (Establish Ack) to the RNC.

Upon receipt of it, the SNL of the corresponding RNC transfers a primitive SNL-EST-CONF indicating a completion of the logical link connection establishment to the upper user part.

In response to the link establishment request of the remote, the following cases are processed to be abnormal.

First, in case that the received ImC-ID value is already in use, the SNL-EST_IND is transferred to the user part and the state is converted to 'Remote-PreActive'. And, when the SNL-REL-RESP is received by the user part, the state is converted to 'idle' and 'Release Ack' is transferred. When the SNL-EST-RESP is received by the user part, the state is converted to 'active' and 'Establish Ack' is transferred.

Also, in case of an internal error that the SNL or the upper block is not normally operated and the case of frame error, no operation is performed.

Figure 7:
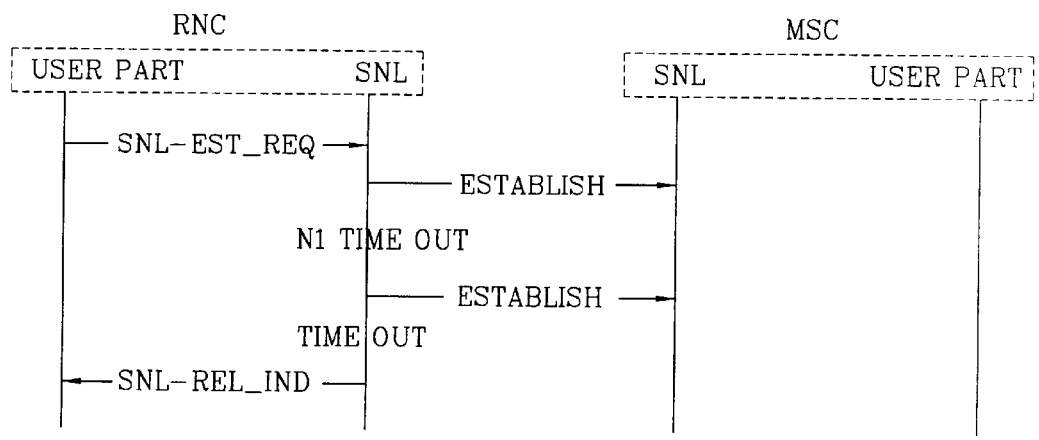
FIG. 7 shows a procedure in case that a time-out occurs in the logical link connection establishment in the mobile communication network in accordance with the present invention.

In addition, as shown in FIG. 7, even after the connection request message (Establish) was transferred, there is no response for a predetermined time, the 'Establish' is re-transferred as many times as N1 count. In case where there is no response received even in the re-transferring, the SNL-REL-INE is transferred to the upper layer.

Figure 8:
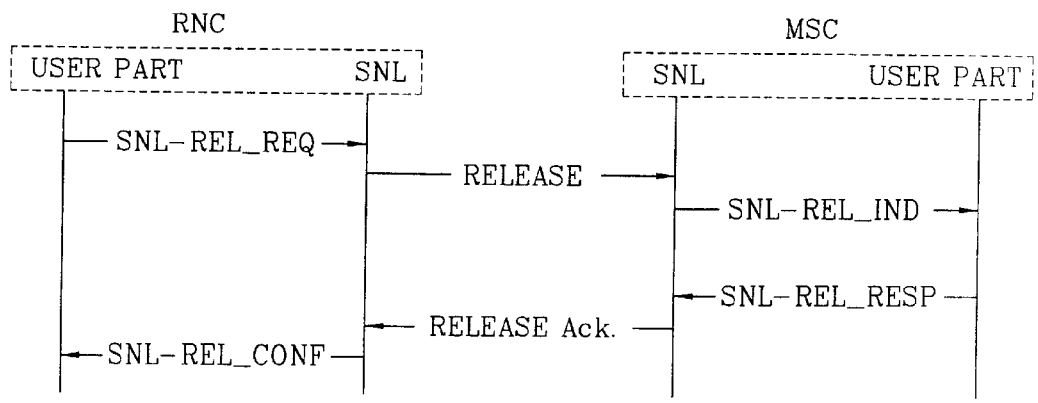
FIG. 8 shows a logical link connection releasing procedure in the mobile communication network in accordance with the present invention.

Procedure of releasing the logical link according to the SNL protocol will now be described with reference to FIG. 8.

When the primitive SNL-REL-REQ requesting for releasing of the logical link from the upper user part of the RNC is transferred, the SNL transfers a release request message (Release) to the MSC together with the ImC-ID, upon receipt of it.

Upon receipt of the release request message (Release), the SNL of the corresponding MSC transfers the primitive (SNL-REL-IND) ordering release of the logical link connection to the user part. And then, when the SNL receives the release response primitive (SNL-REL-RESP) from a corresponding upper user part, it transfers the release response message (Release Ack) to the RNC.

Upon receipt of it, the SNL of the corresponding RNC transfers a primitive (SNL-REL-CONF) indicating that the logical link connection is completely released to the upper user part.

Procedure of transferring message between the RNC and the MSC in a state that the logical link connection is established will now be described by classifying it to a process of transferring a connection-mode message and that of transferring a connectionless-mode message.

Figure 9:
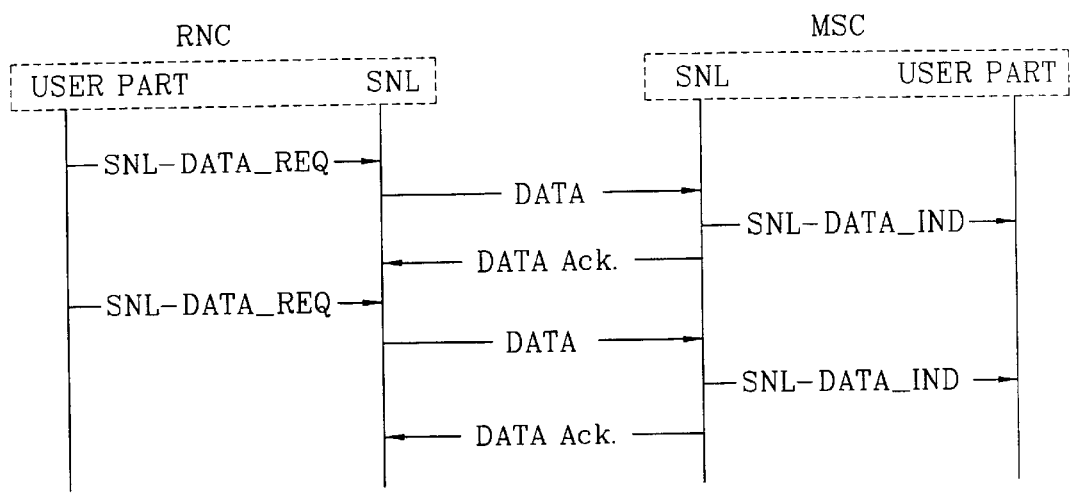
FIG. 9 shows a connection-mode message transmission procedure in the mobile communication network in accordance with the present invention.
Figure 10:
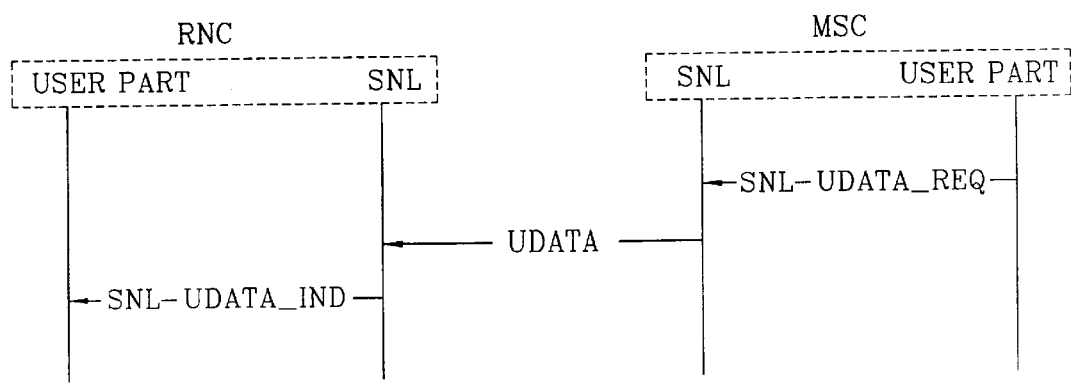
FIG. 10 shows a connectionless-mode message transmission procedure in the mobile communication network in accordance with the present invention.

FIG. 9 shows a connection-mode message transmission procedure in the mobile communication network in accordance with the present invention, and FIG. 10 shows a connectionless-mode message transmission procedure in the mobile communication network in accordance with the present invention.

The process of transferring the connection-mode message refers to an SNL service that transfers data after peer-to-peer connection is first established, where the message of the user part is transferred to the peer through a data frame.

In this process, in case that the primitive (SNL-DATA_REQ) requesting transferring of message is transferred from the upper user part of the RNC through the established logical link, the SNL transfers the message (Data) of the user part, that is, a connection-mode data frame, to the MSC together with the ImC-ID, upon receipt of it.

Then, the SNL of the corresponding MSC transfers a data ordering primitive (SNL-DATA-IND) to the user part, and at the same time, transfers the data response message (Data Ack) to the RNC.

Meanwhile, the connectionless-mode message transmission process refers to a service that transfers a desired data directly to the other party without establishing a connection of peer-to-peer, which is used for the case of transferring a user part message from the MSC to the RNC when a call is received from a mobile communication subscriber, for which since the ImC-ID uses a global connection ID, there is no response to the message receipt of the peer.

As shown in FIG. 10, as to the connectionless-mode message transmission process, in case that a primitive (SNL-UDATA_REQ) requesting transmission of a user part message, that is, a connectionless message, is transferred from the upper user part of the MSC, the SNL transmits a user part message (Udata), that is, a connectionless data frame, to the RNC together with a global connection ID indicating the entire logical link connection, upon receipt of it.

Accordingly, the SNL of a corresponding RNC transfers a data indicating primitive (SNL-UDATA_IND) to the upper user part.

As so far described, according to the signaling network layer protocol in an ATM-based mobile communication network of the present invention, in case where a signal message is processed between the MSC and the RNC on the based of the ATM, a proper signaling network layer protocol is provided to process the signal message by the primitive corresponding to the upper user part or the lower signaling link part internally, so that various parameters required for processing the signal message and its process are simplified, thereby simplifying maintenance in view of operation and minimizing a load for processing the signal message.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A signaling network layer protocol in an ATM-based mobile communication network including a point-to-point connection between an MSC and an RNC, comprising:
   a predetermined message form;
   a primitive between upper and lower layers;
   a state; and
   an operating procedure of a protocol individual, wherein the predetermined message form, primitive, state, and operating procedure are defined so that a signal message between the MSC and RNC is processed through a single signaling network layer (SNL), said single signaling network layer located between an application layer and a signaling ATM adaptation layer (SAAL) layer.

2. A signaling network layer protocol in an ATM-based mobile communication network including a point-to-point connection between an MSC and an RNC, comprising:
   a predetermined message form;
   a primitive between upper and lower layers;
   a state; and
   an operating procedure of a protocol individual, wherein the predetermined message form, primitive, state, and operating procedure are defined so that a signal message between the MSC and RNC is processed through a single signaling network layer (SNL), and wherein the predetermined message form includes a signaling network interface (SNI) carrying information on a message type, an imaginary connection identifier (ImC-ID), and an SNI body including an upper user part signal message for use in a data frame and a unit-data frame.

3. The protocol according to claim 2, wherein the message type is defined as a connection establishment request frame, a connection establishment response frame, a connection establishment release request frame, a connection release completion frame, a connection-mode data frame, a connectionless-mode data frame, and a response frame to the connection-mode data frame.

4. The protocol according to claim 2, wherein the imaginary connection identifier includes a bit indicating a direction of an SNL message, and a bit indicating an imaginary connection identifier value.

5. A signaling network layer protocol in an ATM-based mobile communication network including a point-to-point connection between an MSC and an RNC, comprising:
   a predetermined message form;
   a primitive between upper and lower layers;
   a state; and
   an operating procedure of a protocol individual, wherein the predetermined message form, primitive, state, and operating procedure are defined so that a signal message between the MSC and RNC is processed through a single signaling network layer (SNL), and wherein the primitive is defined as a primitive related to a logical link connection establishing; a primitive related to a logical link connection releasing; a primitive related to a connection-mode message transmission; and a primitive related to a connectionless-mode message transmission.

6. The protocol according to claim 5, wherein the primitive related to the logical link connection establishment is defined as:
   a logical link connection establishment request primitive that a upper user part requests the SNL of the RNC to establish a logical link connection;
   a logical link connection establishment indication primitive that the SNL of the MSC orders the upper user part to establish the logical link connection to the SNL of the RNC;
   a logical link connection establishment response primitive that the user part of the MSC responds to the SNL of the MSC for the logical link connection establishment order; and
   a logical link connection establishment identifying primitive for identifying that the logical link connection establishment from the SNL of the RNC to the user part of the RNC is completed.

7. The protocol according to claim 5, wherein the primitive related to the logical link connection releasing is defined as:
   a logical link connection release request primitive that the upper user part of the RNC requests the SNL of the RNC to release the logical link connection;
   a logical link connection release ordering primitive that the SNL of the MSC order the user part of the MSC to release the logical link connection;
   a logical link connection release response primitive that the user part of the MSC responds to the SNL of the MSC for the order for releasing the logical link connection; and
   a logical link connection release identification primitive for identifying that the logical link connection establishment from the SNL of the RNC to the user part of the RNC is completed.

8. The protocol according to claim 5, wherein the primitive related to connection-mode data transmission is defined as:
   a connection-mode data transmission request primitive that the user part requests the SNL to transmit a connection-mode data; and
   a connection-mode data transmission request primitive for ordering that the SNL transmits the connection-mode data to the user part.

9. The protocol according to claim 5, wherein the primitive related to connectionless-mode data transmission is defined as:
   a connectionless-mode data transmission request primitive that the user part requests the SNL to transmit a connectionless-mode data; and
   a connectionless-mode data transmission ordering primitive that the user part orders the SNL to transmit a connectionless-mode data.

10. A signaling network layer protocol in an ATM-based mobile communication network including a point-to-point connection between an MSC and an RNC, comprising:

a predetermined message form;
a primitive between upper and lower layers;
a state; and
an operating procedure of a protocol individual, wherein the predetermined message form, primitive, state, and operating procedure are defined so that a signal message between the MSC and RNC is processed through a single signaling network layer (SNL), and
wherein a state of the protocol individual is defined as:
an Idle state indicating a state that a logical virtual linking has not been established and linking between peers has not been established,
a Local-PreActive state indicating a state that a local first transfers a linking establishment request and is waiting for a response,
a Remote-PreActive state indicating a state that 'Remote' is going to send a response as it received the linking establishment request, and
an Active state indicating a state that peer-to-peer connection has been established through the logical virtual link.

11. A signaling network layer protocol in an ATM-based mobile communication network including a point-to-point connection between an MSC and an RNC, comprising:
a predetermined message form;
a primitive between upper and lower layers;
a state; and
an operating procedure of a protocol individual, wherein the predetermined message form, primitive, state, and operating procedure are defined so that a signal message between the MSC and RNC is processed through a single signaling network layer (SNL), and wherein the signal message processing procedure between the protocol individuals includes:
establishing a logical link connection between the RNC and the MSC;
transmitting a message through the connection-established logical link; and
releasing the connection-established logical link.

12. The protocol according to claim 11, wherein the logical link connection establishing step includes the sub-steps of:
receiving a logical link connection establishment request primitive from the upper user part of the RNC and transmitting a connection establishment request message together with the imaginary connection identifier to the MSC;
receiving the connection establishment request message and transmitting a logical link connection establishment order primitive to the upper user part;
transmitting a connection establishment response message to the RNC in case that a logical link connection establishment response primitive is received from the upper user part; and
receiving the connection establishment response message and transferring a logical link connection establishment identifying primitive to the upper user part.

13. The protocol according to claim 12, further includes a step of transferring the logical link connection establishment order primitive in case that the imaginary connection identifier is already in use, transmitting the connection release response message when the logical link release response primitive is received from the user part, or transmitting the connection establishment response message when the logical link connection establishment response primitive is received from the user part.

14. The protocol according to claim 12, further includes the steps of:
repeatedly transmitting the connection establishment request message for predetermined times in case that there is no response for a predetermined time after the connection establishment request message is transmitted from the RNC to the MSC; and
transferring the logical link connection release order primitive to the upper user part in case that no response is received for the predetermined times.

15. The protocol according to claim 11, wherein the message transmission step includes sub-steps of:
receiving a data transmission request primitive from the upper user part of the RNC and transmitting a data transmission message together with the imaginary connection identifier to the MSC,
receiving the data transmission message and transferring the data transmission order primitive to the upper user part; and
transmitting the data response message to the RNC.

16. The protocol according to claim 11, wherein the logical link connection releasing step includes the sub-steps of:
receiving a logical link connection release request primitive from the upper user part of the RNC and transmitting a connection release request message together with the imaginary connection identifier to the MSC;
receiving the connection release request message and transmitting a logical link connection release order primitive to the upper user part;
transmitting a connection release response message to the RNC in case that a logical link connection release response primitive is received from the upper user part; and
receiving the connection release response message and transferring a logical link connection release identifying primitive to the upper user part.

17. A signaling network layer protocol in an ATM-based mobile communication network including a point-to-point connection between an MSC and an RNC, comprising:
a predetermined message form;
a primitive between upper and lower layers;
a state; and
an operating procedure of a protocol individual, wherein the predetermined message form, primitive, state, and operating procedure are defined so that a signal message between the MSC and RNC is processed through a single signaling network layer (SNL), and wherein processing of the signal message includes performing connectionless-mode message transmission for transmitting a user part message from the MSC to the RNC without a logical link connection establishment.

18. The protocol according to claim 17, wherein the connectionless-mode message transmission includes:
transmitting the data transmission message including the connectionless data transmission request primitive and the imaginary connection identifier from the upper user part of the MSC to the RNC; and
receiving the data transmission message and transferring the data transmission order primitive to the upper user part.

19. The protocol according to claim 1, wherein the protocol stack is a signaling No. 7 protocol stack.

20. The protocol according to claim 19, wherein the signaling network layer (SNL) is located in layer 3 of the signaling No. 7 protocol stack.

21. The protocol according to claim 1, wherein the SNL layer performs a signal message transmission function and a signal connection managing function.

22. A method for transmitting information through an ATM-based mobile communication network, comprising:

providing a signaling network layer protocol for transmitting a signal message between an MSC and an RNC through a point-to-point connection, said protocol having a predetermined message form, a primitive between upper and lower layers, a state, and an operating procedure of a protocol individual; and communicating the signal message between the MSC and RNC through a single signal network layer (SNL) of the protocol based on the predetermined message form, primitive, state, and operating procedure, wherein the predetermined message form includes a signaling network interface (SNI) carrying information on a message type, an imaginary connection identifier (ImC-ID), and an SNI body including an upper user part signal message for use in a data frame and a unit-data frame.

23. A method for transmitting information through an ATM-based mobile communication network, comprising:

providing a signaling network layer protocol for transmitting a signal message between an MSC and an RNC through a point-to-point connection, said protocol having a predetermined message form, a primitive between upper and lower layers, a state, and an operating procedure of a protocol individual; and communicating the signal message between the MSC and RNC through a single signal network layer (SNL) of the protocol based on the predetermined message form, primitive, state, and operating procedure, wherein the primitive is defined as a primitive related to a logical link connection establishing, a primitive related to a logical link connection releasing, a primitive related to a connection-mode message transmission, and a primitive related to a connectionless-mode message transmission.

24. A method for transmitting information through an ATM-based mobile communication network, comprising:

providing a signaling network layer protocol for transmitting a signal message between an MSC and an RNC through a point-to-point connection, said protocol having a predetermined message form, a primitive between upper and lower layers, a state, and an operating procedure of a protocol individual; and communicating the signal message between the MSC and RNC through a single signal network layer (SNL) of the protocol based on the predetermined message form, primitive, state, and operating procedure, wherein a state of the protocol individual is defined as:

an Idle state indicating a state that a logical virtual linking has not been established and linking between peers has not been established, a Local-PreActive state indicating a state that a local first transfers a linking establishment request and is waiting for a response, a Remote-PreActive state indicating a state that 'Remote' is going to send a response as it received the linking establishment request, and an Active state indicating a state that peer-to-peer connection has been established through the logical virtual link.

25. A method for transmitting information through an ATM-based mobile communication network, comprising:

providing a signaling network layer protocol for transmitting a signal message between an MSC and an RNC through a point-to-point connection, said protocol having a predetermined message form, a primitive between upper and lower layers, a state, and an operating procedure of a protocol individual; and communicating the signal message between the MSC and RNC through a single signal network layer (SNL) of the protocol based on the predetermined message form, primitive, state, and operating procedure, wherein the operating procedure includes:

establishing a logical link connection between the RNC and the MSC;

transmitting a message through the connection-established logical link; and releasing the connection-established logical link.

26. A method for transmitting information through an ATM-based mobile communication network, comprising:

providing a signaling network layer protocol for transmitting a signal message between an MSC and an RNC through a point-to-point connection, said protocol having a predetermined message form, a primitive between upper and lower layers, a state, and an operating procedure of a protocol individual; and communicating the signal message between the MSC and RNC through a single signal network layer (SNL) of the protocol based on the predetermined message form, primitive, state, and operating procedure, wherein communicating the signal message includes performing connectionless-mode message transmission for transmitting a user part message from the MSC to the RNC without a logical link connection establishment.

* * * * *